United States Patent
Li et al.

(10) Patent No.: US 7,362,822 B2
(45) Date of Patent: Apr. 22, 2008

(54) RECURSIVE REDUCTION OF CHANNEL STATE FEEDBACK

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 10/937,097

(22) Filed: Sep. 8, 2004

(65) Prior Publication Data
US 2006/0092054 A1 May 4, 2006

(51) Int. Cl.
H04L 27/04 (2006.01)
(52) U.S. Cl. .............................. 375/299; 375/347
(58) Field of Classification Search ................ 375/267, 375/299, 347
See application file for complete search history.

(56) References Cited

U.S. PATENT DOCUMENTS

| | | | |
|---|---|---|---|
| 4,559,605 A * | 12/1985 | Norsworthy ............... 708/403 |
| 5,999,826 A | 12/1999 | Whinnett |
| 6,597,678 B1 | 7/2003 | Kuwahara et al. |
| 6,847,805 B2 | 1/2005 | Liu |
| 6,927,728 B2 | 8/2005 | Vook et al. |
| 7,236,748 B2 | 6/2007 | Li et al. |
| 2003/0085832 A1* | 5/2003 | Yu ............................ 342/16 |
| 2003/0086366 A1* | 5/2003 | Branlund et al. ........... 370/208 |
| 2003/0125040 A1 | 7/2003 | Walton, Jr. et al. |
| 2003/0210750 A1 | 11/2003 | Onggosanusi et al. |
| 2004/0235433 A1 | 11/2004 | Hugl et al. |
| 2005/0101259 A1 | 5/2005 | Tong et al. |
| 2006/0056335 A1 | 3/2006 | Lin et al. |
| 2006/0056531 A1 | 3/2006 | Li et al. |
| 2006/0068718 A1 | 3/2006 | Li et al. |
| 2006/0068738 A1 | 3/2006 | Li et al. |

OTHER PUBLICATIONS

*International Search Report and Written Opinion of the Inernational Searching Authority*; Dated Jan. 31, 2006; PCT/US2005/031585, pp. 1-13.
Jihoon, C., "Interpolation based transmit beamforming for MIMO-OFDM with Limited Feedback", *IEEE International Conference on Paris, France, Piscataway, NJ, USA.*, P20442PCT—PCT Search Report Written Opinion from PCT application serial No. PCT/US2005/031585,(Jun. 20, 2004), pp. 249-253.
"PCT Search Report", PCT/US2005/031979, (Jan. 23, 2006), 12 pages.
June, C. R., "Channel Feedback Quantization Method for MISO and MIMO Systems", *Personal Indoor and Mobile Radio Communications, IEEE International Symposium*, vol. 2, (Sep. 5, 2004), 805-809.
Onggosanusi, E. N., et al., "A Feedback-based Adaptive Multi-Input Multi-Output Signaling Scheme", *Conference Record of the 36th Asilomar Conference on Signals, Systems, & Computers, IEEE*, US, vol. 1 (2), Conf. 36, (Nov. 3, 2002), 1694-1698.
Roh, June C., et al., "An Efficient Feedback Method for MIMO Systems with Slowly Time-Varying Channels", *WCNC 2004/IEEE Communications Society*, 760-764.

* cited by examiner

*Primary Examiner*—Kevin Kim
(74) *Attorney, Agent, or Firm*—Dana B. Lemoine; Lemoine Patent Services, PLLC

(57) ABSTRACT

Feedback bandwidth may be reduced in a closed loop MIMO system by Householder transformations and vector quantization using codebooks.

23 Claims, 7 Drawing Sheets

RECURSIVE REDUCTION OF CHANNEL STATE FEEDBACK

FIELD

The present invention relates generally to wireless networks, and more specifically to wireless networks that utilize multiple spatial channels.

BACKGROUND

Closed loop multiple-input-multiple-output (MIMO) systems typically transmit channel state information from a receiver to a transmitter. Transmitting the channel state information consumes bandwidth that might otherwise be available for data traffic.

DESCRIPTION OF EMBODIMENTS

Figure 1:
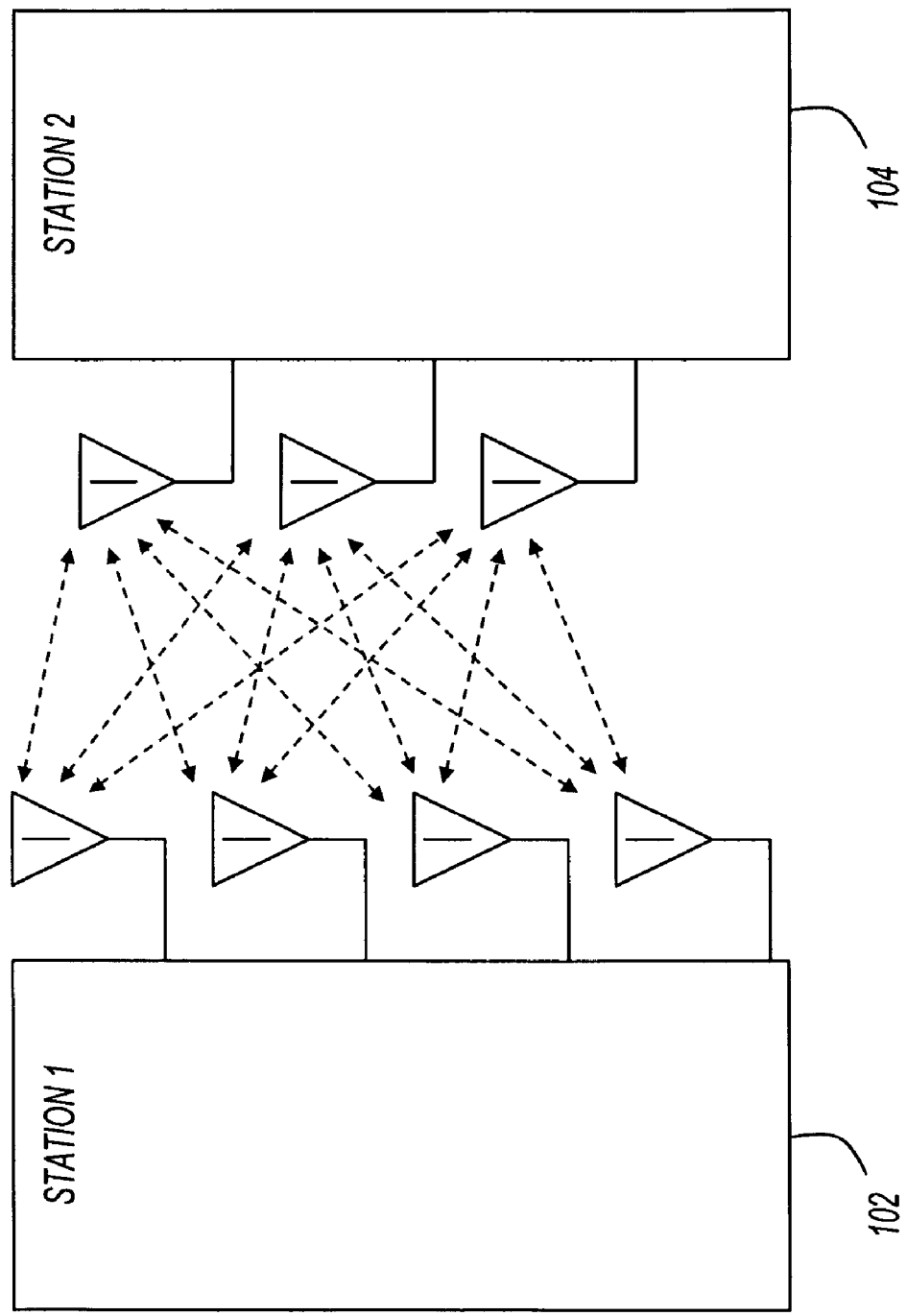
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like. Further, in some embodiments, stations 102 and 104 are part of a wireless wide area network (WWAN). For example, one or more of stations 102 and 104 may be a base station or a subscriber unit. Although only two stations are shown in FIG. 1, any number of stations may be present without departing from the scope of the present invention.

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with any other standard, such as any future IEEE personal area network standard or wide area network standard.

Stations 102 and 104 may include any number of antennas. In the example of FIG. 1, station 102 includes four antennas, and station 104 includes three antennas. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath. The channel between stations 102 and 104 is described by the channel state matrix, H, that includes entries describing the complex channel gains between each transmit and receive antenna pair.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, no channel state information is explicitly fed back from another station. In closed loop systems, communications bandwidth is utilized to transmit channel state information between stations, and thereby reducing overall throughput. The channel state information can be employed for various enhancements such as transmit beamforming and adaptive modulation. The communications bandwidth used for this purpose is referred to herein as "feedback bandwidth." When feedback bandwidth is reduced in closed loop MIMO systems, more bandwidth is available for data communications.

Various embodiments of the present invention provide for closed loop MIMO with a compact feedback scheme, thereby saving feedback bandwidth. In some embodiments, feedback bandwidth is saved by feeding back transmit beamforming vectors instead of the channel matrix H. Further, in some embodiments, the elements of each beamforming vector are jointly quantized by vector quantization using codebooks. In some of these embodiments, different size codebooks are used for different ones of the transmit beamforming vectors. For example, in some embodiments, three beamforming vectors are quantized using three small codebooks of sizes 16, 32 and 64 respectively. Further, in some embodiments, beamforming vectors are only fed back for the active spatial channels. This provides a significant overhead reduction in the case of spatial channel puncture, where the spatial channel corresponding to the weakest eigenmode is usually punctured. Additionally, in some embodiments the mean (and variance) of eigenvalues for each active spatial channel is fed back for adaptive modulation, where the mean (and variance) is computed over the sorted eigenvalues on OFDM subchannels. For example, each OFDM subchannel has two active spatial channels that corresponds to two eigenvalues. The two eigenvalues are sorted for each subchannel. The mean (and variance) of the first sorted eigenvalues is computed over the subchannels and is fed back. Similarly, the mean (and variance) of the second sorted eigenvalues does so.

The various embodiments of the present invention provide a systematic, uniform scheme supporting all antenna configurations such as 2×2, 4×2, 4×4 and beyond, and one set of codebooks may be shared among the various antenna configurations. Further, the reconstructed matrix is unitary without additional correction.

A transmit beamforming matrix may be found using singular value decomposition (SVD) of the channel state matrix H as follows:

$$H_{m \times n} = U_{m \times m} D_{m \times n} V'_{n \times n} \quad (1)$$

$$x_{n \times 1} = V_{n \times n} d_{n \times 1} \quad (2)$$

where d is the n-vector of data symbols containing k non-zero elements, where k is the number of active spatial channels (see next paragraph); x is the beamformed, transmitted signal vector on n transmit antennas; H is the channel matrix; H's singular value decomposition is H=UDV'; U and V are unitary; D is a diagonal matrix with H's eigenvalues; V is n by n and only the first k columns are needed to be fed back. Equation (2) is the beamforming act at the transmitter after the beamforming matrix V is fed back from the receiver to the transmitter.

Various embodiments of the present invention combine Householder reflection techniques with vector quantization in the quantization of V, the unitary beamforming matrix. First, a Householder reflection matrix, P, is constructed from $v_1$, the first column of V, where V is n by k; n is the number of transmit antennas; k is the number of spatial streams. The P matrix has the property that the first column of the product, PV, is $[e^{j\Phi_1} \ 0 \ \ldots \ 0]^T$. And the first row of PV becomes $[e^{j\Phi_1} \ 0 \ \ldots \ 0]$ due to orthogonality. Then, the quantization of an n by k V matrix is converted into the quantization of n-vector $v_1$ and the quantization of an n−1 by k−1 matrix $V_1$. This conversion reduces overhead and quantization complexity. The process is repeated to quantize $V_1$ and convert the problem to the quantization of (n−1)-vector $v_2$ and n−2 by k−2 matrix $V_2$. This repeats k−1 times. Finally, the quantization of V is converted to the quantization of $v_1, v_2, \ldots, v_k$ that are k unit vectors of dimensions n, n−1, ..., n−k+1.

In some embodiments, an access point may send training signals to a station and the station may compute and feedback the beamforming matrix V in (1). If the station knows beforehand that the access point only employs k spatial streams, the station may only feed back the first k columns of the V matrix, which corresponds to the k strongest eigenmodes of H. This offers an additional reduction in feedback bandwidth. The degree of freedom of H is $2n^2$ while the degree of freedom of V is $n^2-n$ for m=n. Since only V is useful for transmit beamforming and V contains less information than H, feeding back V is more efficient than feeding H.

Quantization of the beamforming matrix V is illustrated below by an example, in which 4 transmit antennas exist and 3 receive antennas exist. Although the example employs a 4×3 system, the various embodiments of the invention are not so limited. The receiver receives training symbols and computes the beamforming matrix, V as shown above in equation (1). Next, the receiver only needs to quantize the first 3 columns of V since the channel supports at most three modes. If the receiver knows the transmitter only employs two spatial channels, the receiver may only quantize the first two columns of V in the scheme depicted next.

In some embodiments, the V matrix is quantized column by column and recursively. After the quantization of one column, the size of the problem is reduced by one on both row and column dimensions. Denoting the beamforming matrix as:

$$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \quad (3)$$

the first column of V denoted as $v_1$ may be quantized as follows.

$$\hat{v}_1 = \arg \max_{u \in C_1} \|u^H v_1\| \quad (4)$$

where $C_1$ is a codebook containing unit 4-vectors for quantization shown at the bottom of this description. $\hat{v}_1$ has the maximum inner product among all unit vectors in the codebook. The codebook is constructed such that the codeword vectors distribute on the n-dimension complex unit sphere as uniformly as possible. Additionally, the first element of each codeword is set to be real for the next step.

A Householder reflection matrix is constructed as follows $$F_1 = I - \frac{2}{\|w_1\|^2} w_1 w_1^H, \quad (5)$$

In some embodiments, the householder reflection matrix is determined as a function of the original column vector, in which case $$w_1 = v_1 - e_1 = \begin{bmatrix} v_{11} - 1 \\ v_{21} \\ v_{31} \\ v_{41} \end{bmatrix}.$$

In other embodiments, the householder reflection matrix is determined as a function of the value of the vector selected from the codebook, in which case $$w_1 = \hat{v}_1 - e_1 = \begin{bmatrix} \hat{v}_{11} - 1 \\ \hat{v}_{21} \\ \hat{v}_{31} \\ \hat{v}_{41} \end{bmatrix}.$$

If $\hat{v}_1 = v_1$, Householder reflection converts the first column and row of V into $[e^{j\phi_1}\ 0\ 0\ 0]^T$ and $e^{j\phi_1}[1\ 0\ 0]$ as shown in (6), where $\phi_1$ is the phase of $v_{11}$. Since usually $\hat{v}_1 \approx v_1$, there will be nonzero residuals in the off diagonal entries of the first column and row.

$$F_1 V = \begin{bmatrix} e^{j\phi_1} & 0.0 & 0.0 \\ 0.0 & \begin{bmatrix} \hat{v}_{11} & \hat{v}_{12} \\ \hat{v}_{21} & \hat{v}_{22} \\ \hat{v}_{31} & \hat{v}_{32} \end{bmatrix} \\ 0.0 & \underbrace{\phantom{xxxxxxx}}_{v_2} \end{bmatrix}, \quad (6)$$

where two properties are employed to get the result, i.e. $\hat{v}_{11}$ is real and the unitary property of V. Since both $F_1$ and V are unitary, $V_2$ is unitary. From (6), we see that the size of $V_2$ is 3×2 and it is reduced from that of $V_1$ by one on both row and column dimensions. Recursively, we repeat the actions in (4), (5), and (6) on $V_2$ as follows. First, we quantize the first column of $V_2$ denoted as $v_2$, using another codebook of unit 3-vectors shown at the bottom of this description, whose first element of each codeword is real. Then, we construct a Householder reflection matrix and multiply it with $V_2$ as follows.

$$F_2 V_2 = \begin{bmatrix} e^{j\phi_2} & 0.0 \\ 0.0 & \begin{bmatrix} \bar{v}_{11} \\ \bar{v}_{21} \end{bmatrix} \\ 0.0 & \underbrace{\phantom{xx}}_{v_3} \end{bmatrix} \quad (7)$$

Finally, we quantize the vector $V_3$ using a codebook of unit 2-vectors shown at the bottom of this description. The quantization indexes of $v_1$, $v_2$, and $v_3$ are fed back to the access point, i.e. the transmitter, for beamforming. It is worth noting that the phases $\phi_i$ may not be sent back. In some embodiments, for high speed and low complexity, the codebooks are generated such that their sizes are no larger than 64. Since the codebook size is small, the Householder matrix for each codeword can be stored beforehand to reduce computational complexity.

The pseudo code of quantization algorithm for a general beamforming matrix is listed as follows.

1. Compute singular value decomposition of the downlink channel matrix H with size m by n as in equation (1), and obtain the first k columns of the beamforming matrix V, where k is the number of active spatial channels.
2. Let $\tilde{V} = V_{:,1:k}$, which is a temporary matrix and is formed by the first k columns of V.
3. For i=1: min(k,n−1)
   3.1. Let $v_i = \tilde{V}_{:,1}$, which is the first column of $\tilde{V}$.
   3.2. Quantize $v_i$ by finding $\hat{v}_i = \arg\max_{u \in C_i} \|u^H v_i\|$, where $C_i$ is a codebook of unit n−1 vectors
   3.3. Record the index of $\hat{v}_i$ in the codebook for feedback.
   3.4. Construct a Householder reflection matrix as $$F_i = I - \frac{2}{\|w_i\|^2} w_i w_i^H,$$

where $w_i = \hat{v}_i - e_1$ and $e_1$ is the unit vector with all zero elements except the first equal to one.
   3.5. Conduct Householder reflection on $\tilde{V}$ as $\hat{V} = F_i \tilde{V}$. To reduce complexity, one only needs to compute columns and rows of $\hat{V}$ other than the first one.
   3.6. Update $\tilde{V} = \hat{V}_{2:n-i+1, 2:k}$.
4. End For small matrix V, the SVD computation above can be skipped as follows. The vector codebooks $C_i$ for $v_i$ uniquely defines a matrix codebook, C, for V, where each codeword can be constructed using codewords in $C_i$ as shown in (9) and (10). We can test the beamforming performance of the beamforming matrixes (or codewords) in C and select the codeword having the best performance. One way to test the beamforming performance is as follows.

1. Apply the beamforming matrix under test, $\overline{V}(t)$, to the channel matrix H, where $\overline{V}(t)$ is the t-th codeword in C. The combined channel matrix after the beamforming is as $$G = H\overline{V}(t) \quad (8)$$

2. The signal to interference plus noise ratios (SINR) of this beamformed channel G can be computed in order to estimate the performance of $\overline{V}(t)$. For linear receivers such as MMSE and zero-forcing receiver, the computation of the SINR for each spatial stream is known.

3. Compare the sets of SINRs corresponding to $\overline{V}(t)$s, and select the best $\overline{V}(t)$, where the selection criterion may be maximum mean SINR averaged over spatial streams, or minimum estimated packet error rate. We find and feed the quantization index corresponding to the optimal $\overline{V}(t)$.

At the transmitter side, the reconstruction of the beamforming matrix V is as follows. It starts from the lowest dimension and recursively constructs the whole matrix. In each step, a Householder matrix is computed from a reconstructed unit vector. The Householder matrix can be computed and stored beforehand for small codebooks. Even in the case that there is no quantization error, the reconstructed matrix could be different from the original V by a global phase on each column and this is fine with closed loop MIMO. First, two vectors, $v_3$ and $v_2$, are reconstructed using the feedback quantization indexes and the corresponding 2-vector and 3-vector codebooks. Second, a Householder matrix is computed using the reconstructed $\hat{v}_2$ as $$F_2 = I - \frac{2}{\|w\|^2} w w^H, \quad (9)$$

where $w = \hat{v}_2 - e_1$ and $\hat{v}_2$ is the reconstructed 3-vector; $F_2$ can be stored beforehand to reduce computation. Third, $V_2$ can be reconstructed as $$\hat{V}_2 = F_2 \begin{bmatrix} 1 & 0 \\ 0 & \hat{v}_3 \\ 0 & \end{bmatrix} \quad (10)$$

Fourth, we reconstruct the first column of V using the quantization index and compute a Householder matrix as $$F_1 = I - \frac{2}{\|w\|^2} w w^H, \quad (11)$$

where $w = \hat{v}_1 - e_1$ and $\hat{v}_1$ is the reconstructed first column of V. Finally, the beamforming matrix V is given by $$\hat{V} = F_1 \begin{bmatrix} 1 & 0 & 0 \\ 0 & & \\ 0 & \hat{V}_2 & \\ 0 & & \end{bmatrix}. \quad (12)$$

Since the codebook size is less than 64, which is small, the Householder matrix for each codebook entry can be stored beforehand to speedup the reconstruction.

In general, the receiver of the beam forming vector index can reconstruct the beam forming vector according to the following algorithm.

---

1. Receive indices $n_i$, $i = 1, \ldots, N_n$, where $N_n$ is the number of feedback indices.
2. If $k < n$, where $k$ and $n$ are the numbers of spatial streams and transmit antennas respectively, do
   - 2.1 Let $\tilde{V} = \hat{v}_N$, the $n_N$-th vector of the codebook of $(n - k + 1)$ dimension unit vector.
   - 2.2 $J = N_n - 1$.
3. Else
   - 3.1 Let $\tilde{V} = 1$.
   - 3.2 $J = N_n$.
4. End
5. for $i = J:-1:1$
   - 5.1 $\hat{v}_i$ = the $n_i$-th vector of the codebook of $(n - 1 + 1)$ dimension unit vector
   - 5.2 $F_i = I - \frac{2}{\|w\|^2} w w^H$, $w = \hat{v}_i - e_1$.
   - 5.3 $\hat{V} = F_i \begin{bmatrix} 1 & 0 \\ 0 & \hat{V} \end{bmatrix}$.
6. End

---

Quantization of large unit vector can be done as follows. It should be noticed that the quantization of the unit vector in (4) is computational intensive for unit vectors of large size. Three schemes are proposed for the quantization of large unit vectors.

Scheme1

Figure 2:
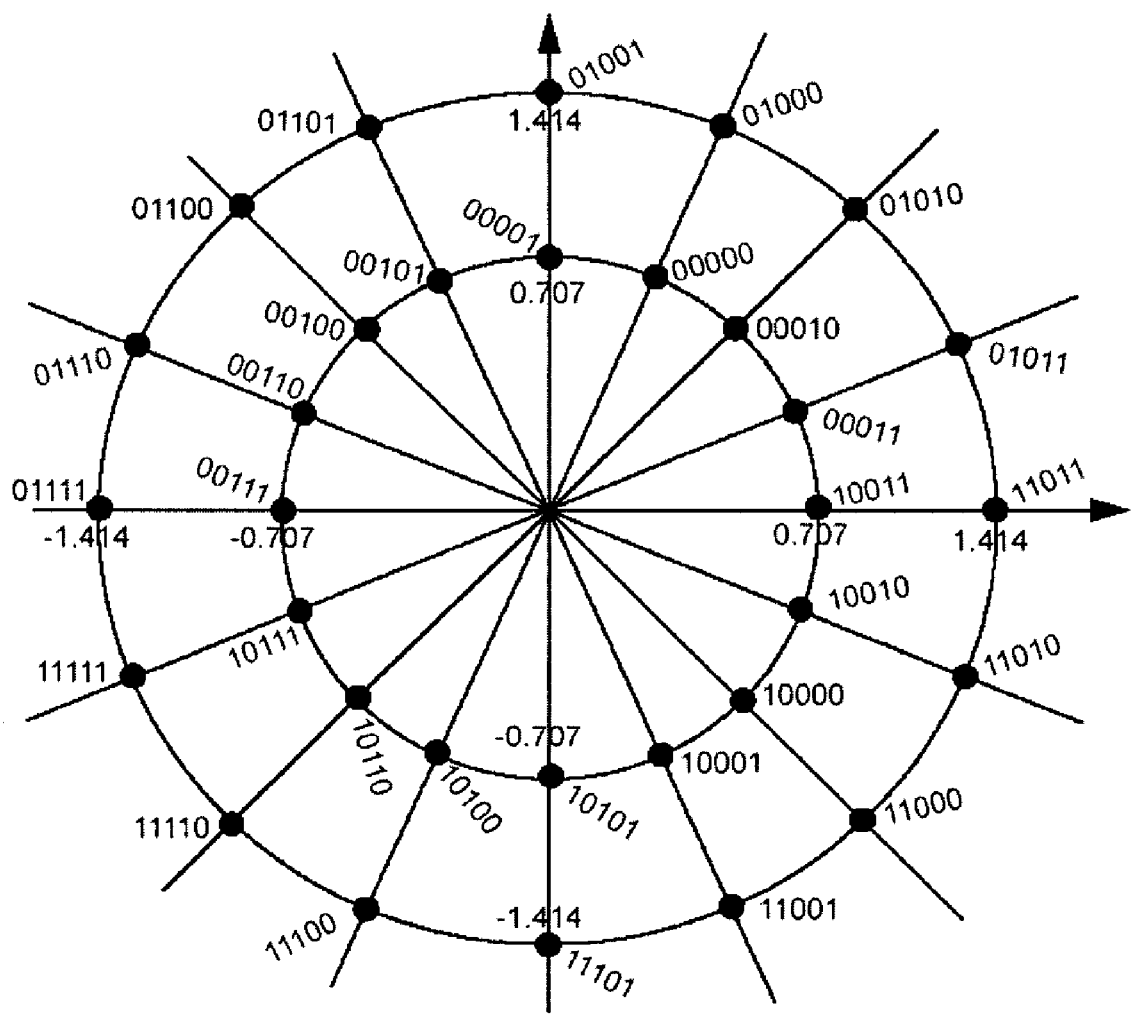
FIG. 2 shows a constellation in accordance with various embodiments of the present invention.

We quantize each element of the unit vector using scalar quantization. For example, we may quantize unit vector $v = [v_1 \ldots v_n]^T$ as follows. We first normalize the average power of each element of v to be unity, i.e. $\sqrt{n}v$. Then, we may quantize each element of $\sqrt{n}v$ using the radial quantization constellation shown in FIG. 2. The quantization indexes are feed back to the transmitter for reconstruction.

Scheme2

We first partition the unit vector into sub-vectors and quantize each sub-vector using vector quantization methods e.g. vector codebooks. The quantization index of each sub-vector is feed back to the transmitter for the reconstruction of the large vector.

Scheme3

Quantization Acts

1: Partition the vector into two sub-vectors, $\tilde{u}_1$ and $\tilde{u}_2$, as $$v = \begin{bmatrix} v_1 \\ \vdots \\ v_i \\ v_{i+1} \\ \vdots \\ v_n \end{bmatrix} \begin{matrix} \} \tilde{u}_1 \\ \\ \} \tilde{u}_2 \end{matrix}$$

2: Normalize $\tilde{u}_i$ as $\tilde{u}_i = a_i u_i$ for $i=1,2$, where $\|u_i\|=1$, $\|a_1\|^2 + \|a_2\|^2 = 1$, and $a_i \geq 0$. $\|a_1\|^2 + \|a_2\|^2 = 1$ is because v is a unit vector.

3: Quantize $u_1$ and $u_2$. If we employ vector quantization, we may employ different codebooks depending on the value of $a_i$. For example, if $a_i$ is large, then we may employ a codebook of more entries for $u_i$ than that if $a_i$ is small. Denote the quantized vectors of $u_1$ and $u_2$ as $\hat{u}_1$ and $\hat{u}_2$ respectively. The quantization indexes for $u_1$ and $u_2$ are fed back to the transmitter.

4: Compute the global phase difference between $u_i$ and $\hat{u}_i$ for $i=1,2$ as $\phi_i = \text{phase}(\hat{u}'_i u_i)$. These phases may already be computed in 3 during the quantization of $u_1$ and $u_2$.

5: Compute $\phi = \phi_2 - \phi_1$, which is phase difference between the lower and upper sub-vectors, $u_2$ and $u_1$.

6: Quantize $\phi$ and one of $a_1$ and $a_2$ jointly or separately. Feed back the quantization indexes.

Reconstruction Acts

1: Reconstruct $a_i$. If $a_1$ is quantized and fed back, then $\hat{a}_2 = \sqrt{1-\hat{a}_1^2}$, where $\hat{a}_1$ is the reconstructed $a_1$ from the feedback index. Similarly, if $a_2$ is quantized, then $\hat{a}_1 = \sqrt{1-\hat{a}_2^2}$.

2: Reconstruct $\phi$ and denote the reconstructed phase as $\hat{\phi}$.

3: Reconstruct $u_1$ and $u_2$ using the quantization indexes. Denote the reconstructed vectors as $\hat{u}_1$ and $\hat{u}_2$.

4: Reconstruct v as $$\hat{v} = \begin{bmatrix} a_1 u_1 \\ e^{j\hat{\phi}} a_2 u_2 \end{bmatrix}.$$

The number of sub-vectors in Scheme 3 can be generalized to L that is greater than 2 as follows.

Scheme 3.1

Quantization Acts

1: Partition the vector into L sub-vectors, $\tilde{u}_1, \ldots, \tilde{u}_L$, as $$v = \begin{bmatrix} \tilde{u}_1 \\ \vdots \\ \tilde{u}_L \end{bmatrix}$$

2: Normalize $\tilde{u}_i$ as $\tilde{u}_i = a_i u_i$ for $i=1, \ldots, L$ where $\|u_i\|=1$, $\Sigma \|a_i\|^2 = 1$, and $a_i \geq 0$. $\Sigma \|a_i\|^2 = 1$ is because v is a unit vector.

3: Quantize $u_i$, for $i=1, \ldots, L$. If we employ vector quantization, we may employ different codebooks depending on the value of $a_i$. For example, if $a_i$ is large, then we may employ a codebook of more entries for $u_i$ than that if $a_i$ is small. Denote the quantized vectors of $u_i$ as $\hat{u}_i$. The quantization index for each $u_i$ is fed back to the transmitter.

4: Compute the global phase difference between $u_i$ and $\hat{u}_i$ for $i=1, \ldots, L$ as $\phi_i = \text{phase}(\hat{u}'_i u_i)$. These phases may already be computed in 3 during the quantization of $u_i$.

5: Compute $\phi_j = \phi_j - \phi_1$ for $j=2, \ldots, L$, where $\phi_j$ is the phase difference between sub-vector, $u_j$ and $u_1$.

6: Quantize $\phi_j$ for $j=2, \ldots, L$, and L-1 of $a_i$ for $i=1, \ldots, L$ jointly or separately Feed back the quantization indexes.

If the dimension of the unit vector is large, the vector can be partitioned into multiple sub-vectors and Scheme 3 can also be applied recursively to quantize the unit vector as follows.

Scheme 3.2

Quantization Acts

1: Partition the vector into L sub-vectors, $\tilde{u}_1, \ldots, \tilde{u}_L$, as $$v = \begin{bmatrix} \tilde{u}_1 \\ \vdots \\ \tilde{u}_L \end{bmatrix}$$

2: Normalize $\tilde{u}_i$ as $\tilde{u}_i = a_i u_i$ for $i=1, \ldots, L$ where $\|u_i\|=1$, $\Sigma \|a_i\|^2 = 1$, and $a_i \geq 0$. $\Sigma \|a_i\|^2 = 1$ is because v is a unit vector.

3: Quantize $u_i$, for $i=1, \ldots, L$. If we employ vector quantization, we may employ different codebooks depending on the value of $a_i$. For example, if $a_i$ is large, then we may employ a codebook of more entries for $u_i$ than that if $a_i$ is small. Denote the quantized vectors of $u_i$ as $\hat{u}_i$. The quantization index for each $u_i$ is fed back to the transmitter.

4: Compute the global phase difference between $u_L$ and $\hat{u}_L$ as $\tilde{\phi} = \text{phase}(\hat{u}'_L u_L)$. Let $\tilde{l} = a_L$, $\tilde{u} = u_L$, and $\tilde{v} = \hat{u}_L$.

5: For i=L-1:-1:1 Do 5.1 Compute the global phase difference between $u_i$ and $\hat{u}_i$ as $\phi_i = \text{phase}(\hat{u}'_i u_i)$.

5.2 Compute $\phi = \tilde{\phi} - \phi_i$ and $$\theta = \tan\left(\frac{\tilde{l}}{a_i}\right).$$

5.3 Quantize $\cos(\theta)$ and $\sin(\theta)e^{j\phi}$ jointly or respectively, and feed back quantization indexes.

5.4 Let $$\tilde{u} = \begin{bmatrix} u_i \\ \tilde{u} \end{bmatrix} \text{ and } \tilde{v} = \begin{bmatrix} \cos(\hat{\theta})\hat{u}_i \\ \sin(\hat{\theta})e^{j\hat{\phi}}\tilde{v} \end{bmatrix},$$

where $\hat{\theta}$ and $\hat{\phi}$ are quantized $\phi$ and $\theta$.

5.4 Compute $\tilde{\phi} = \text{phase}(\tilde{v}'\tilde{u})$ and $\tilde{l} = \|\tilde{v}\|$.

End

Figure 3:
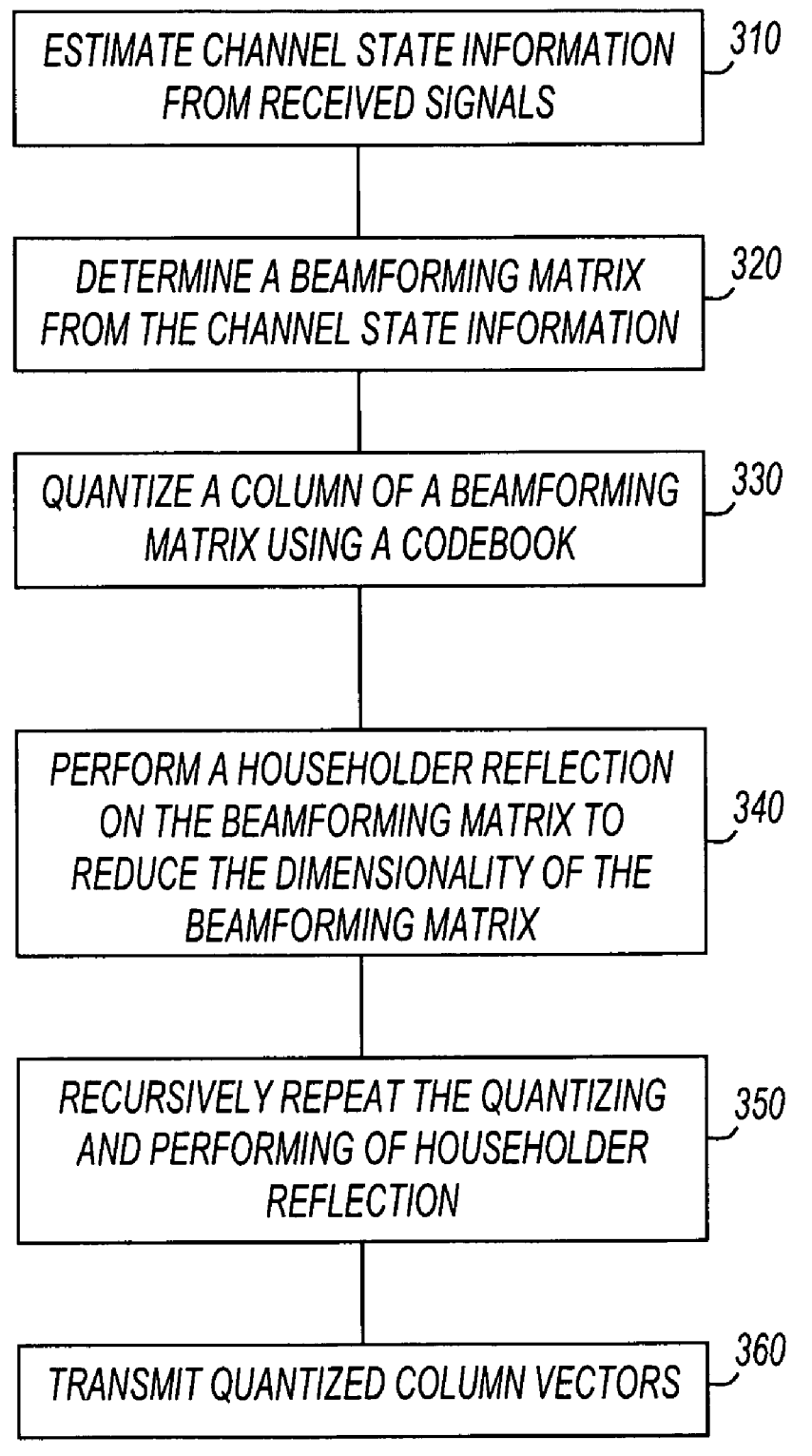
FIGS. 3 and 4 show flowcharts in accordance with various embodiments of the present invention.

FIG. 3 shows a flowchart in accordance with various embodiments of the present invention. In some embodiments, method 300 may be used in, or for, a wireless system that utilizes MIMO technology. In some embodiments, method 300, or portions thereof, is performed by a wireless communications device, embodiments of which are shown in the various figures. In other embodiments, method 300 is performed by a processor or electronic system. Method 300 is not limited by the particular type of apparatus or software element performing the method. The various actions in method 300 may be performed in the order presented, or may be performed in a different order. Further, in some embodiments, some actions listed in FIG. 3 are omitted from method 300.

Method 300 is shown beginning at block 310 in which channel state information is estimated from received signals. The channel state information may include the channel state matrix H described above. At 320, a beamforming matrix is determined from the channel state information. In some embodiments, this corresponds to performing singular value decomposition (SVD) as described above with reference to equation (1). The beamforming matrix V is also described above.

At 330, a column of a beamforming matrix is quantized using a codebook. In various embodiments of the present invention, the actions of 330 correspond to searching a code block for an entry that most closely matches the column vector. For example, the operations described above with reference to equation (4) may be utilized to search a code book. In various embodiments of the present invention, the size of the codebook, and therefore the number of bits used to represent the quantized vector, may vary. For example, in some embodiments, a large codebook may be used for all column vectors. Also for example, in some embodiments longer column vectors may be quantized using larger codebooks, and a smaller column vectors may be quantized using a smaller code book.

At 340, a householder reflection is performed on the beamforming matrix to reduce the dimensionality of the beamforming matrix. In some embodiments, the actions of 340 correspond to the operations described above with reference to the equations (5) and (6). At 350, the quantizing and householder reflection operations of 330 and 340 are recursively repeated. As the operations are recursively repeated, each of the column vectors may be quantized using the same codebook or different codebooks. For example, as the dimensionality of the beamforming matrix is reduced, smaller codebooks may be used for successive column vectors. In some embodiments, where three column vectors are quantized, codebooks of descending size may be utilized such that the column vectors are quantized into eight bits, six bits, three bits, or six bits, five bits, and four bits, or five bits, four bits, and three bits, although this is not a limitation of the present invention.

In some embodiments of method 300, quantizing and Householder reflection is recursively performed until a small matrix remains, and the small matrix is quantized using a codebook of small matrices. Also in some embodiments, large column vectors may be quantized by breaking the large column vectors into two or more sub-vectors, and then each of the sub-vectors may be quantized using one or more codebooks. The partition itself may be quantized using one or more codebooks. In still further embodiments, column vectors or sub-vectors may be quantized by normalizing the average power of each element, and quantizing each element using a radial constellation, such as the radial constellation shown in FIG. 2. At 360, the quantized column vectors are transmitted.

Figure 4:
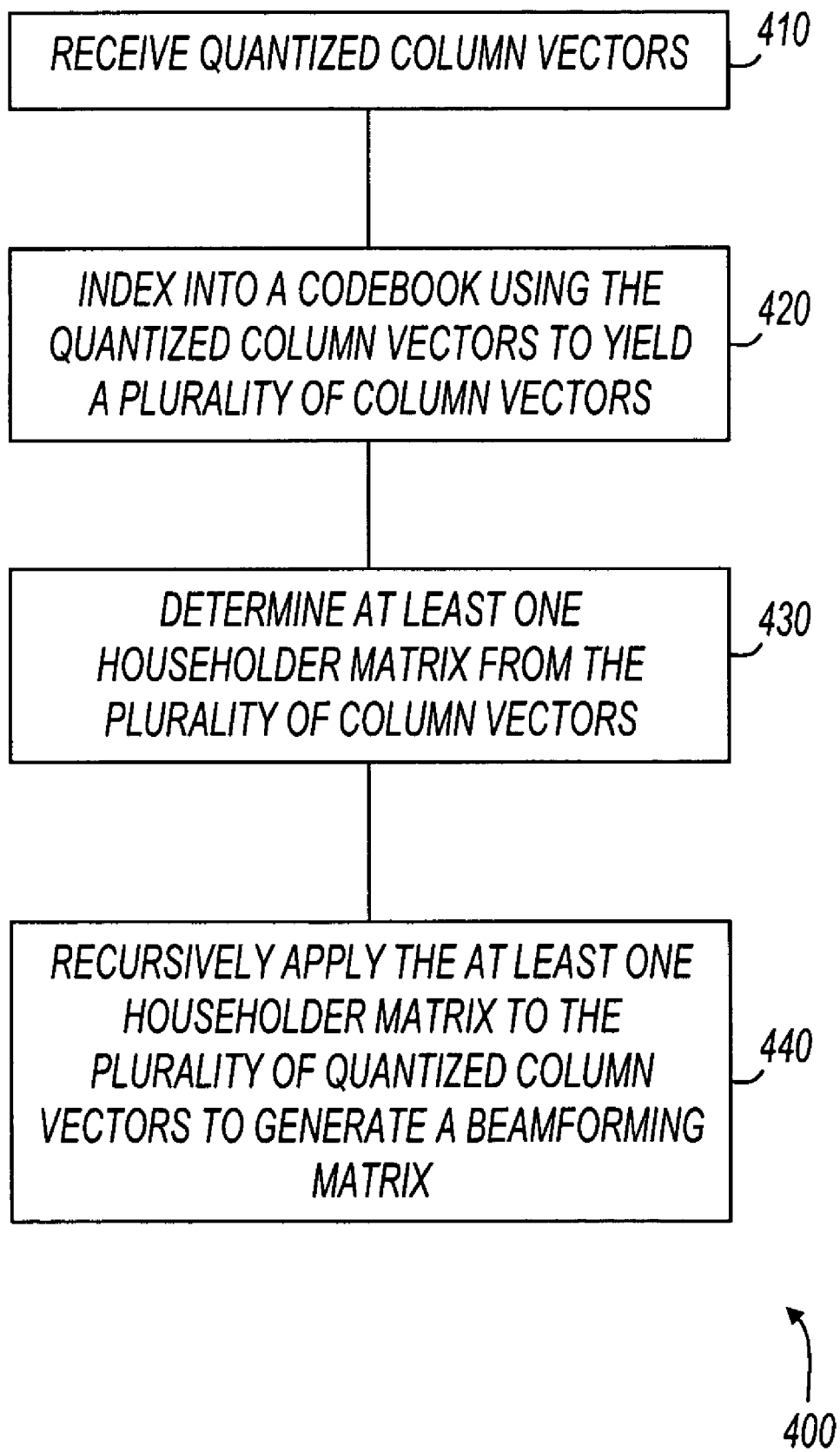

FIG. 4 shows a flowchart in accordance with various embodiments of the present invention. In some embodiments, method 400 may be used in, or for, a wireless system that utilizes MIMO technology. In some embodiments, method 400, or portions thereof, is performed by a wireless communications device, embodiments of which are shown in the various figures. In other embodiments, method 400 is performed by a processor or electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning at block 410 in which quantized column vectors are received. At 420, one or more codebooks are indexed into using the quantized column vectors to yield a plurality of column vectors. The actions of 420 may take many different forms. For example, quantized column vectors make each the represented by a different number of bits, and each may correspond to a different codebook of column vectors. Further, one or more column vectors may be represented as quantized sub-vectors, and each quantized sub-vector may be used to index into one or more codebooks, and a single column vector may be regenerated from multiple codebook entries.

At 430, at least one householder matrix is determined from the plurality of column vectors. In some embodiments, this may correspond to performing operations such as those described above with reference to equations (9) and (11). In other embodiments, a table may be maintained with a one-to-one correspondence between quantized column vectors and Householder matrices. In these embodiments, a householder matrix may be determined by indexing into a table using quantized column vector values.

At 440, be at least one householder matrix is recursively applied to the plurality of quantized column vectors to generate a beamforming matrix. In some embodiments, the operations of 440 may correspond to the actions described above with respect to equations (10) and (12). Further, in some embodiments, the operations of method 400 may correspond to the operations represented by the pseudo-code appearing above after equation (12). After the beamforming matrix is reproduced, the apparatus performing method 400 may utilize the beamforming matrix to operate on transmitted signals in a MIMO system.

Figure 5:
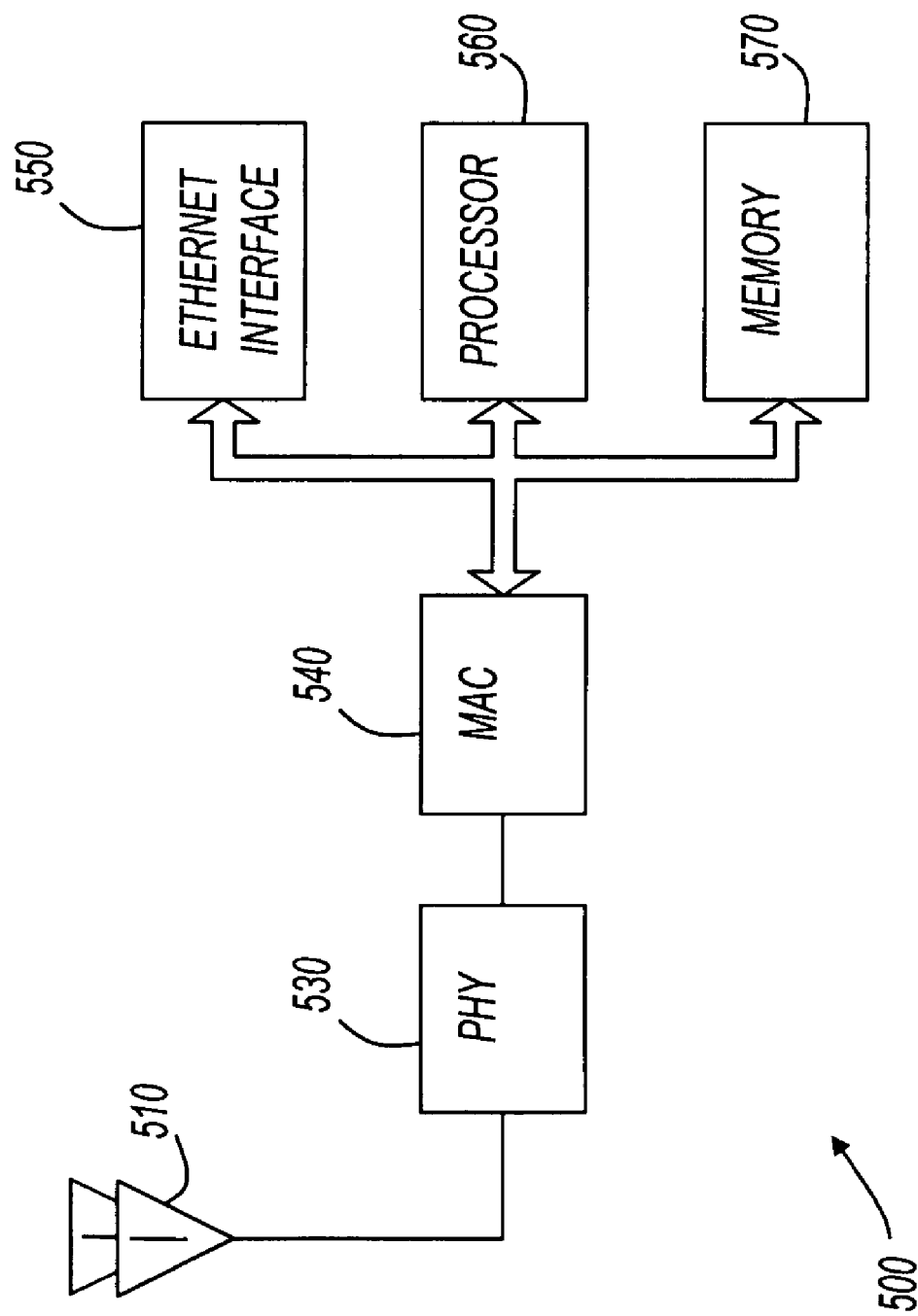
FIG. 5 shows an electronic system in accordance with various embodiments of the present invention.

FIG. 5 shows a system diagram in accordance with various embodiments of the present invention. Electronic system 500 includes antennas 510, physical layer (PHY) 530, media access control (MAC) layer 540, Ethernet interface 550, processor 560, and memory 570. In some embodiments, electronic system 500 may be a station capable of quantizing column vectors and performing Householder transformations as described above with reference to the previous figures. In other embodiments, electronic system 500 may be a station that receives quantized column vectors, and performs beamforming in a MIMO system. For example, electronic system 500 may be utilized in a wireless network as station 102 or station 104 (FIG. 1). Also for example, electronic system 500 may be a station capable of performing the calculations shown in any of the equations above.

In some embodiments, electronic system 500 may represent a system that includes an access point, a mobile station, a base station, or a subscriber unit as well as other circuits. For example, in some embodiments, electronic system 500 may be a computer, such as a personal computer, a workstation, or the like, that includes an access point or mobile station as a peripheral or as an integrated unit. Further, electronic system 500 may include a series of access points that are coupled together in a network.

In operation, system 500 sends and receives signals using antennas 510, and the signals are processed by the various elements shown in FIG. 5. Antennas 510 may be an antenna array or any type of antenna structure that supports MIMO processing. System 500 may operate in partial compliance with, or in complete compliance with, a wireless network standard such as an 802.11 standard.

Physical layer (PHY) 530 is coupled to antennas 510 to interact with a wireless network. PHY 530 may include circuitry to support the transmission and reception of radio frequency (RF) signals. For example, in some embodiments, PHY 530 includes an RF receiver to receive signals and perform "front end" processing such as low noise amplification (LNA), filtering, frequency conversion or the like. Further, in some embodiments, PHY 530 includes transform mechanisms and beamforming circuitry to support MIMO signal processing. Also for example, in some embodiments, PHY 530 includes circuits to support frequency up-conversion, and an RF transmitter.

Media access control (MAC) layer 540 may be any suitable media access control layer implementation. For example, MAC 540 may be implemented in software, or hardware or any combination thereof. In some embodiments, a portion of MAC 540 may be implemented in hardware, and a portion may be implemented in software that is executed by processor 560. Further, MAC 540 may include a processor separate from processor 560.

In operation, processor 560 reads instructions and data from memory 570 and performs actions in response thereto. For example, processor 560 may access instructions from memory 570 and perform method embodiments of the present invention, such as method 300 (FIG. 3) or method 400 (FIG. 4) or methods described with reference to other figures. Processor 560 represents any type of processor, including but not limited to, a microprocessor, a digital signal processor, a microcontroller, or the like.

Memory 570 represents an article that includes a machine readable medium. For example, memory 570 represents a random access memory (RAM), dynamic random access memory (DRAM), static random access memory (SRAM), read only memory (ROM), flash memory, or any other type of article that includes a medium readable by processor 560. Memory 570 may store instructions for performing the execution of the various method embodiments of the present invention. Memory 570 may also store beamforming matrices or beamforming vectors.

Although the various elements of system 500 are shown separate in FIG. 5, embodiments exist that combine the circuitry of processor 560, memory 570, Ethernet interface 550, and MAC 540 in a single integrated circuit. For example, memory 570 may be an internal memory within processor 560 or may be a microprogram control store within processor 560. In some embodiments, the various elements of system 500 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 550 may provide communications between electronic system 500 and other systems. For example, in some embodiments, electronic system 500 may be an access point that utilizes Ethernet interface 550 to communicate with a wired network or to communicate with other access points. Some embodiments of the present invention do not include Ethernet interface 550. For example, in some embodiments, electronic system 500 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

Fast Codebook Search

Figure 6:
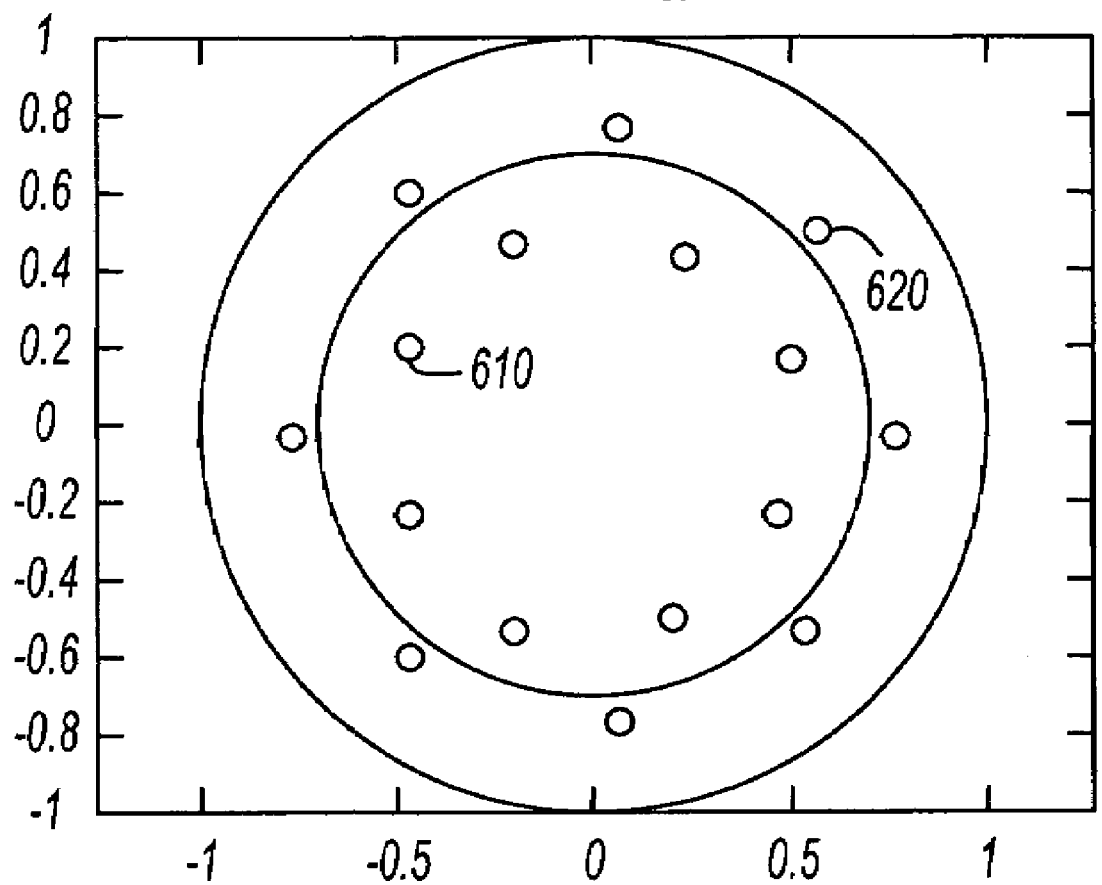
FIG. 6 shows distributions of codewords in a plane.

Equation (4) searches the vector codebook to find the unit vector that is the closest to the quantizing unit vector. The computation may intensive for large codebooks since it computes inner product for each codeword. A scheme of low complexity is depicted next. We partition each unit vector in the codebook into two sub-vectors as $$v = \begin{bmatrix} \begin{Bmatrix} v_1 \\ \vdots \\ v_i \end{Bmatrix} \tilde{u}_1 \\ \begin{Bmatrix} v_{i+1} \\ \vdots \\ v_n \end{Bmatrix} \tilde{u}_2 \end{bmatrix} = \begin{bmatrix} au_1 \\ \sqrt{1-a^2}\, e^{j\phi} u_2 \end{bmatrix} \quad (13)$$

where $\|u_i\|=1$ for i=1 and 2; and $1 \geq a \geq 0$. This is similar to Scheme 3. Several observations are made. First, unit vector v is uniformly distributed in a sphere due to the construction of the codebook. Secondly, $\phi$ is uniformly distributed in $[0,2\pi)$. Thirdly, the distribution of a is uni-podal. As an example, a 16-entry codebook is plot in (a cos $\phi$, a sin $\phi$) plane in FIG. 6. In FIG. 6, the x-axis and y-axis are a cos $\phi$ and a cos $\phi$ respectively. Each small circle represents one unit vector in the codebook. For example circles 610 and 620 represent unit vectors in the codebook.

Figure 7:
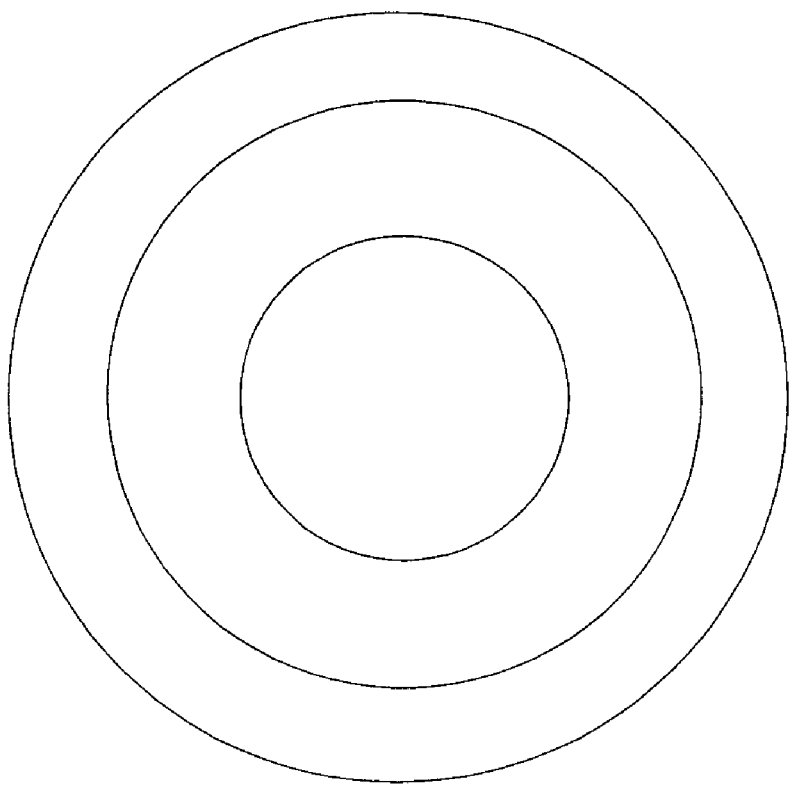
FIG. 7 shows a partition of a codebook according to a parameter.
Figure 8:
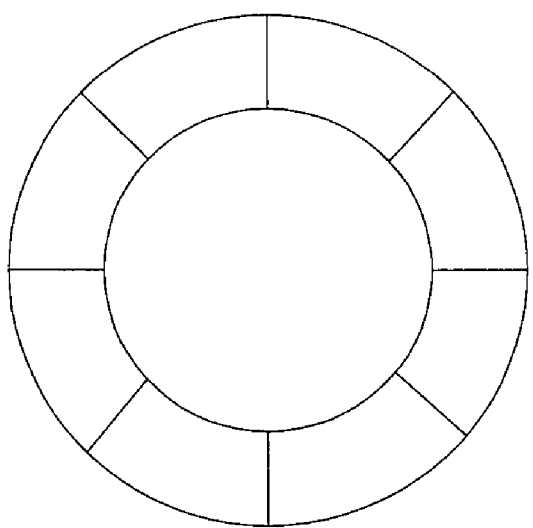
FIG. 8 shows a partition of a portion of a codebook according to a parameter.

For any given unit vector v, it corresponds to a point in the (a cos $\phi$, a sin $\phi$) plane. If two unit vectors have a large inner product then they should be close to each other in the (a cos $\phi$, a sin $\phi$) plane. Quantizing a unit vector v is equivalent to find the codeword having the largest inner product with v. To reduce searching complexity, the codewords away from v in (a cos $\phi$, a sin $\phi$) plane don't need to be checked. Namely, the inner product computation can be saved for those codewords. For a given partition such as that in (13), the codewords can be sorted by a and $\phi$. For example, a codebook can be partitioned according to the value of a of each codeword as shown in FIG. 7, and then the ring portions can be further portioned according to the value of $\phi$ of the codeword in the ring as shown in FIG. 8. The partitioned regions may partially overlap. It should be noticed that the partition of the codebook corresponds to the partition of the unit vector such as that in (13). For a different vector partition, a new partition of the same codebook can be generated. For example, a unit vector can be partitioned otherwise as follows. The first sub-vector consists of the elements in the odd places of the original unit vector, while the second sub-vector consists of the elements in even places. Multiple partitions of the same codebook further reduce the complexity of quantization.

The quantization of a unit vector v can be accelerated as follows.

Initialization:

1: Define one or more partitions of a unit vector, which partitions the vector into two sub-vectors.

2: Partition the codebook into overlapped regions according to the a and $\phi$ of each codeword for each vector partition.

Quantization:

1: Partition a given unit vector v into two sub-vectors using each defined vector partition.

2: Compute the $a_i$ and $\phi_i$ of v for vector partition i for all i.

3: For codebook partition i that corresponds to vector partition i, find the region containing $a_i$ and $\phi_i$. If only one vector partition is defined, then find the codeword having the largest inner product with v within the region. Otherwise, find the common codewords in all the regions containing $a_i$ and $\phi_i$ for all i. This step saves the inner product computation for the non-common codewords. Finally, find the codeword having the largest inner product with v within the common codewords.

Codebooks

The following codebooks are chosen to minimize the mean quantization errors. These codebooks are equivalent to any of their unitary transformed versions. In choosing the normalization, the following choices were made: The first entry is a unit vector in $e_1$ direction and the first element of all codebook entries is real. This choice reduces the number of memory elements needed to store the codebook. Each n-vector m-entry codebook uses 2 mn−m−2 n real memory space.

1. Codebook for Unit 2-vector with 4 Entries

| 1.0000 | 0.5774 | 0.5774 | 0.5774 |
|---|---|---|---|
| 0 | −0.0613 + 0.8142i | −0.6745 − 0.4602i | 0.7358 − 0.3540i |

2. Codebook for Unit 2-vector with 8 Entries

| 1.0000 | 0.7941 | 0.7941 | 0.7940 |
|---|---|---|---|
| 0 | 0.0189 − 0.6074i | 0.4813 + 0.3711i | −0.2635 + 0.5478i |
| 0.7940 | 0.5112 | 0.3289 | 0.3289 |
| −0.5905 − 0.1442i | 0.7771 − 0.3672i | 0.2178 + 0.9189i | −0.5716 − 0.7517i |

3. Codebook for Unit 2-vector with 16 Entries

| | | | |
|---|---|---|---|
| 1.0000 | 0.8997 | 0.8997 | 0.8970 |
| 0 | 0.0150 − 0.4362i | 0.3612 + 0.2452i | −0.4388 − 0.0533i |
| 0.8969 | 0.8463 | 0.7259 | 0.7250 |
| −0.2129 + 0.3875i | 0.4748 − 0.2417i | −0.4396 − 0.5290i | 0.1703 + 0.6674i |
| 0.6409 | 0.6409 | 0.6102 | 0.6099 |
| 0.3045 − 0.7046i | 0.7491 + 0.1679i | −0.7922 − 0.0056i | −0.4612 + 0.6444i |
| 0.3730 | 0.3722 | 0.3236 | 0.2278 |
| −0.3442 − 0.8616i | 0.4959 + 0.7845i | 0.8426 − 0.4304i | −0.8683 + 0.4406i |

4. Codebook for Unit 3-vector with 8 Entries

| | | | |
|---|---|---|---|
| 1.0000 | 0.5000 | 0.5000 | 0.5000 |
| 0 | 0.6314 − 0.0885i | −0.6315 + 0.0975i | 0.4855 + 0.1593i |
| 0 | 0.3104 + 0.4971i | −0.3186 − 0.4901i | −0.6806 − 0.1603i |
| 0.5000 | 0.5000 | 0.5000 | 0.4954 |
| −0.4891 − 0.1541i | 0.3426 − 0.0921i | −0.3436 + 0.0938i | −0.0143 − 0.8442i |
| 0.6815 + 0.1501i | 0.3837 − 0.6906i | −0.3737 + 0.6953i | −0.2042 − 0.0077i |

5. Codebook for Unit 3-vector with 16 Entries

| | | | |
|---|---|---|---|
| 1.0000 | 0.6488 | 0.6486 | 0.6477 |
| 0 | −0.2722 − 0.6005i | 0.0931 + 0.3515i | 0.3287 + 0.4950i |
| 0 | 0.0706 − 0.3734i | −0.2448 + 0.6223i | −0.4193 − 0.2274i |
| 0.6471 | 0.6466 | 0.6464 | 0.6459 |
| 0.2231 − 0.1846i | 0.1882 + 0.0336i | 0.0794 + 0.6194i | −0.6474 − 0.0518i |
| 0.6831 + 0.1755i | 0.1585 − 0.7213i | 0.4299 + 0.0856i | −0.1405 + 0.3759i |
| 0.6419 | 0.6284 | 0.6207 | 0.4294 |
| 0.1658 − 0.3921i | 0.7339 − 0.2025i | −0.5775 + 0.1865i | 0.1068 − 0.7487i |
| −0.6372 − 0.0277i | 0.0906 − 0.1318i | 0.3938 − 0.3023i | 0.1594 + 0.4672i |
| 0.2074 | 0.1865 | 0.1837 | 0.0374 |
| −0.3795 + 0.0080i | −0.4869 + 0.8293i | −0.4301 + 0.1769i | −0.0488 − 0.6311i |
| 0.6243 + 0.6505i | −0.2010 + 0.0085i | −0.3955 − 0.7704i | −0.3561 − 0.6864i |

6. Codebook for Unit 3-vector with 32 Entries

| | | | |
|---|---|---|---|
| 1.0000 | 0.7526 | 0.7509 | 0.7481 |
| 0 | −0.3439 − 0.0598i | 0.3036 − 0.1884i | −0.0646 − 0.4021i |
| 0 | −0.4612 + 0.3148i | 0.1404 − 0.5374i | 0.5170 − 0.0847i |
| 0.7452 | 0.7449 | 0.7439 | 0.7438 |
| 0.2966 + 0.2876i | 0.1001 + 0.2808i | 0.6040 − 0.2058i | −0.5992 − 0.1147i |
| −0.3700 + 0.3703i | 0.5965 + 0.0199i | 0.1521 + 0.1279i | 0.2120 + 0.1724i |
| 0.7436 | 0.7434 | 0.7425 | 0.7412 |
| −0.2467 + 0.5858i | 0.4184 + 0.4540i | 0.0402 + 0.1029i | 0.0482 − 0.3614i |
| −0.0021 + 0.2075i | −0.0535 − 0.2516i | −0.5397 − 0.3810i | 0.0199 + 0.5633i |
| 0.7395 | 0.7170 | 0.6983 | 0.4699 |
| −0.2918 + 0.2879i | −0.4693 − 0.2755i | 0.0587 − 0.6672i | 0.6648 − 0.2402i |
| 0.2295 − 0.4821i | −0.1499 − 0.4091i | −0.2478 − 0.0486i | −0.5151 + 0.1191i |
| 0.3996 | 0.3786 | 0.3600 | 0.3570 |
| −0.1100 + 0.4286i | −0.4105 + 0.4145i | −0.4324 − 0.1688i | 0.4915 − 0.2007i |
| 0.1781 + 0.7828i | −0.7176 + 0.0373i | 0.7806 + 0.2137i | 0.3794 + 0.6684i |
| 0.3527 | 0.3502 | 0.3464 | 0.3366 |
| −0.1710 − 0.1652i | −0.1031 − 0.4821i | 0.3551 + 0.2984i | 0.2923 − 0.6986i |
| 0.3188 − 0.8470i | −0.6503 − 0.4598i | −0.0099 − 0.8153i | 0.3858 − 0.4055i |
| 0.3362 | 0.3358 | 0.3305 | 0.3255 |
| −0.8816 − 0.0760i | 0.1212 − 0.0659i | −0.2162 − 0.8560i | 0.5691 + 0.7060i |
| −0.2927 + 0.1350i | −0.7672 + 0.5288i | 0.2964 + 0.1529i | −0.1068 + 0.2455i |
| 0.3192 | 0.3191 | 0.3172 | 0.2793 |
| −0.4631 − 0.4748i | 0.7029 + 0.3684i | −0.4168 + 0.7629i | −0.0442 + 0.6588i |
| −0.2546 + 0.6272i | 0.4362 − 0.2794i | 0.3153 − 0.2104i | −0.5048 − 0.4808i |

7. Codebook for Unit 4-vector with 16 Entries

| | | | |
|---|---|---|---|
| 1.0000 | 0.4472 | 0.4472 | 0.4472 |
| 0 | −0.1724 − 0.1948i | −0.3725 + 0.0174i | 0.0856 − 0.0165i |
| 0 | −0.5902 − 0.4842i | 0.6326 + 0.0053i | 0.4763 + 0.6014i |
| 0 | 0.2487 − 0.2962i | 0.3344 + 0.3860i | −0.2861 − 0.3493i |
| 0.4472 | 0.4472 | 0.4472 | 0.4472 |
| −0.4662 + 0.5039i | 0.4065 + 0.5827i | 0.0136 − 0.5519i | 0.4444 + 0.4741i |
| −0.1377 + 0.4998i | −0.3324 + 0.0505i | −0.0125 − 0.3136i | 0.2567 − 0.4724i |
| 0.1467 + 0.1959i | −0.1296 − 0.4068i | −0.1732 + 0.6056i | −0.1022 + 0.2797i |
| 0.4472 | 0.4472 | 0.4472 | 0.4472 |
| −0.5850 + 0.1479i | 0.2245 + 0.2110i | 0.2625 − 0.0166i | 0.2527 − 0.1676i |
| 0.0154 − 0.5690i | −0.2315 + 0.0149i | 0.3068 − 0.4663i | −0.6443 + 0.3722i |
| −0.3067 + 0.1335i | 0.8021 + 0.0893i | −0.1511 − 0.6296i | 0.0144 + 0.3927i |
| 0.4472 | 0.4472 | 0.4472 | 0.4472 |
| −0.0902 + 0.2314i | −0.6060 − 0.1391i | 0.5856 − 0.3342i | 0.0170 − 0.7479i |
| −0.1063 + 0.2369i | 0.1224 + 0.1502i | 0.4462 + 0.1617i | −0.2016 + 0.2127i |
| −0.7846 + 0.2351i | 0.3472 − 0.5052i | 0.3101 + 0.1548i | −0.2699 − 0.2856i |

8. Codebook for Unit 4-vector with 32 Entries

| | | | |
|---|---|---|---|
| 1.0000 | 0.5815 | 0.5803 | 0.5800 |
| 0 | 0.6728 − 0.0304i | −0.4396 − 0.1680i | 0.0638 − 0.0763i |
| 0 | 0.0912 + 0.1924i | 0.1470 + 0.4511i | 0.0043 + 0.1360i |
| 0 | 0.3753 − 0.1487i | −0.2554 + 0.3892i | 0.4924 + 0.6267i |
| 0.5790 | 0.5783 | 0.5778 | 0.5772 |
| −0.0798 − 0.5433i | −0.1493 + 0.3647i | −0.2381 + 0.2152i | 0.3920 − 0.0583i |
| −0.2099 + 0.4487i | 0.1651 + 0.5807i | −0.2892 − 0.6358i | 0.4369 − 0.4250i |
| 0.3190 − 0.1270i | 0.3702 − 0.0933i | −0.1431 − 0.2340i | −0.2533 − 0.2723i |
| 0.5767 | 0.5760 | 0.5752 | 0.5748 |
| 0.3278 + 0.3424i | 0.5150 + 0.1915i | 0.0243 + 0.0894i | 0.1239 − 0.4509i |
| 0.4700 + 0.2072i | −0.2886 − 0.4014i | −0.1112 − 0.0708i | −0.0535 − 0.5173i |
| −0.1927 + 0.3765i | −0.0449 + 0.3462i | −0.7920 + 0.1260i | 0.4243 − 0.0230i |
| 0.5741 | 0.5729 | 0.5727 | 0.5722 |
| −0.2444 − 0.3128i | −0.3048 + 0.6060i | −0.3564 − 0.5752i | −0.0925 − 0.0217i |
| −0.5885 − 0.1460i | −0.2151 − 0.0121i | 0.1201 − 0.1804i | 0.1175 − 0.0683i |
| −0.0992 + 0.3680i | −0.0406 + 0.4044i | −0.3161 − 0.2592i | 0.2986 − 0.7456i |
| 0.5720 | 0.5720 | 0.5717 | 0.5692 |
| 0.3645 − 0.2794i | −0.4313 + 0.3398i | −0.4555 + 0.1227i | 0.1887 − 0.1275i |
| −0.4879 − 0.0847i | 0.4964 − 0.0417i | −0.4262 + 0.3071i | 0.2389 + 0.5234i |
| −0.2309 − 0.4042i | −0.2752 − 0.2180i | −0.2232 − 0.3533i | −0.3608 − 0.4036i |
| 0.5669 | 0.5668 | 0.5665 | 0.5643 |
| −0.2179 − 0.0936i | 0.0474 + 0.4543i | 0.3106 + 0.6309i | −0.7006 − 0.0713i |
| 0.3185 − 0.4950i | 0.3247 − 0.3856i | −0.1126 + 0.0438i | 0.0211 − 0.1262i |
| −0.1483 + 0.5040i | 0.4647 + 0.0086i | −0.1877 − 0.3672i | 0.4102 + 0.0315i |
| 0.3897 | 0.0135 | 0.0090 | 0.0071 |
| 0.0131 − 0.3878i | 0.4962 − 0.0622i | 0.2624 + 0.0945i | 0.6845 − 0.6039i |
| 0.7419 + 0.2868i | −0.2856 − 0.2580i | −0.4780 + 0.5148i | −0.1757 − 0.3642i |
| 0.1920 + 0.1679i | 0.7742 − 0.0471i | 0.5886 + 0.2866i | −0.0097 − 0.0554i |
| 0.0069 | 0.0058 | 0.0046 | 0.0008 |
| 0.1546 + 0.7483i | 0.0390 − 0.4819i | −0.2420 + 0.3154i | 0.5456 + 0.2707i |
| −0.2194 + 0.0308i | −0.3259 − 0.3578i | −0.2618 + 0.5891i | 0.0699 + 0.0884i |
| −0.5637 + 0.2221i | 0.3831 + 0.6207i | −0.2427 + 0.6062i | 0.1840 − 0.7632i |

9. Codebook for Unit 4-vector with 64 Entries

| | | | |
|---|---|---|---|
| 1.0000 | 0.6899 | 0.6892 | 0.6884 |
| 0 | 0.2646 − 0.6236i | −0.4949 + 0.4988i | −0.3373 + 0.0843i |
| 0 | −0.1134 + 0.0228i | −0.1389 − 0.0687i | 0.0189 − 0.3053i |
| 0 | −0.0291 + 0.2257i | 0.0640 − 0.0561i | −0.5428 − 0.1305i |
| 0.6882 | 0.6873 | 0.6867 | 0.6867 |
| 0.4005 − 0.1592i | 0.0675 + 0.2053i | −0.0025 + 0.2047i | 0.1403 − 0.3819i |
| 0.0492 − 0.1322i | −0.3177 − 0.4477i | 0.4546 + 0.2540i | 0.0575 + 0.5078i |
| 0.5584 + 0.0944i | 0.2144 − 0.3654i | −0.4570 − 0.0803i | −0.0735 − 0.3103i |
| 0.6865 | 0.6835 | 0.6834 | 0.6815 |
| −0.1019 − 0.1807i | 0.4833 + 0.2398i | 0.0489 + 0.4950i | −0.0967 + 0.0900i |
| 0.1758 − 0.2421i | −0.0778 − 0.2194i | 0.3846 + 0.2144i | −0.3679 + 0.4953i |
| 0.1078 + 0.6202i | −0.4325 − 0.0217i | 0.2971 + 0.0584i | 0.2643 + 0.2599i |

-continued

| | | | |
|---|---|---|---|
| 0.6812 | 0.6811 | 0.6801 | 0.6798 |
| 0.2106 − 0.0503i | −0.0850 − 0.0071i | 0.4167 + 0.4068i | −0.3638 − 0.2822i |
| −0.0361 + 0.4444i | 0.4651 + 0.0155i | −0.2684 + 0.2810i | −0.4686 − 0.2498i |
| −0.3578 + 0.4028i | 0.1476 − 0.5390i | 0.1064 − 0.1897i | 0.2001 + 0.0626i |
| 0.6779 | 0.6776 | 0.6691 | 0.6674 |
| −0.4620 − 0.2641i | −0.3111 + 0.0354i | 0.1055 + 0.4814i | −0.1586 − 0.4905i |
| 0.2995 + 0.2884i | −0.2317 + 0.1869i | −0.1206 − 0.0501i | 0.3874 − 0.3680i |
| 0.2473 + 0.1525i | −0.0726 − 0.5907i | −0.0295 + 0.5398i | −0.0082 − 0.0569i |
| 0.6219 | 0.6158 | 0.6110 | 0.6067 |
| 0.0306 − 0.2794i | 0.5008 − 0.3037i | 0.1066 + 0.2804i | −0.5547 + 0.0351i |
| −0.5549 − 0.1114i | 0.1027 − 0.1870i | 0.4186 − 0.5915i | −0.0738 + 0.4088i |
| −0.4610 − 0.0382i | −0.0817 − 0.4749i | −0.0353 + 0.1017i | −0.3616 + 0.1404i |
| 0.6024 | 0.5944 | 0.5670 | 0.4713 |
| −0.2557 + 0.1666i | 0.3618 − 0.0342i | 0.6426 − 0.0416i | −0.2584 − 0.5426i |
| −0.0702 + 0.0171i | −0.5930 − 0.2736i | 0.4669 + 0.1481i | 0.1850 + 0.0064i |
| 0.7304 − 0.0725i | 0.1523 + 0.2549i | −0.0506 + 0.1462i | −0.5943 + 0.1709i |
| 0.4671 | 0.4434 | 0.4130 | 0.4033 |
| 0.1507 − 0.3379i | −0.3875 + 0.2337i | −0.0986 − 0.4272i | 0.1335 − 0.1322i |
| 0.0319 − 0.6058i | −0.2220 − 0.6510i | −0.1590 + 0.4303i | 0.6346 + 0.3346i |
| −0.4595 + 0.2564i | −0.0071 + 0.3543i | 0.6257 − 0.1879i | 0.4870 + 0.2240i |
| 0.3917 | 0.3819 | 0.3741 | 0.3623 |
| −0.6602 − 0.5622i | −0.3886 + 0.4925i | 0.1750 − 0.5460i | 0.3505 + 0.3552i |
| −0.0387 − 0.0060i | 0.3083 − 0.3061i | −0.5397 − 0.0018i | 0.2157 + 0.2191i |
| 0.0738 − 0.2961i | 0.3959 + 0.3392i | 0.1165 − 0.4759i | −0.2216 − 0.6900i |
| 0.3581 | 0.3581 | 0.3571 | 0.3413 |
| −0.2724 + 0.5525i | −0.3470 + 0.6183i | −0.5480 + 0.2149i | 0.0131 + 0.6704i |
| −0.1459 + 0.6570i | 0.4409 + 0.0466i | 0.3061 − 0.5573i | −0.1876 + 0.1707i |
| −0.0374 − 0.1947i | −0.1185 − 0.3980i | 0.0936 − 0.3360i | −0.6079 + 0.0024i |
| 0.3392 | 0.3385 | 0.3379 | 0.3343 |
| 0.0093 + 0.3250i | −0.2840 + 0.1067i | 0.1396 + 0.3295i | −0.0767 − 0.3157i |
| −0.8233 + 0.2046i | −0.0565 + 0.3029i | 0.5730 + 0.0330i | 0.7591 + 0.2427i |
| −0.2318 − 0.0761i | 0.0812 + 0.8317i | 0.0396 + 0.6533i | −0.2271 + 0.3099i |
| 0.3173 | 0.3109 | 0.2932 | 0.2850 |
| 0.7447 + 0.5251i | −0.2910 − 0.3256i | 0.6426 − 0.2371i | 0.7010 − 0.2362i |
| 0.0619 − 0.1883i | 0.0600 − 0.5515i | −0.5571 + 0.2499i | −0.0449 + 0.4844i |
| 0.1607 + 0.0627i | 0.6321 − 0.0733i | −0.2523 − 0.0921i | 0.3288 + 0.1636i |
| 0.2803 | 0.2718 | 0.2692 | 0.2611 |
| 0.2262 − 0.4122i | −0.1135 − 0.3920i | 0.2484 + 0.3635i | −0.6202 + 0.0302i |
| 0.0557 − 0.7946i | 0.0387 − 0.2933i | 0.3151 − 0.5331i | 0.5699 + 0.0380i |
| 0.1077 − 0.2328i | 0.1071 − 0.8128i | 0.1524 − 0.5718i | −0.4642 − 0.0676i |
| 0.2601 | 0.2550 | 0.2543 | 0.2491 |
| 0.5093 − 0.4079i | 0.1973 − 0.0627i | 0.3491 − 0.0428i | 0.4927 + 0.2139i |
| −0.0508 − 0.5008i | −0.3691 + 0.2462i | 0.5519 + 0.5917i | −0.2198 + 0.1684i |
| 0.2102 + 0.4571i | −0.6112 − 0.5672i | 0.1156 − 0.3788i | 0.7212 − 0.2293i |
| 0.2468 | 0.2440 | 0.2299 | 0.2133 |
| −0.0489 + 0.0375i | −0.6799 − 0.4190i | 0.0532 + 0.1712i | −0.6352 + 0.3807i |
| −0.7189 + 0.1380i | −0.3260 + 0.1995i | 0.1764 − 0.2053i | −0.4685 + 0.0174i |
| 0.5304 − 0.3436i | 0.0631 + 0.3906i | −0.7566 + 0.5189i | −0.2440 + 0.3560i |
| 0.1948 | 0.1916 | 0.1558 | 0.0304 |
| −0.3185 − 0.1529i | 0.1084 + 0.1450i | 0.1261 − 0.5681i | −0.5753 − 0.6342i |
| −0.0069 + 0.9135i | −0.6424 − 0.2670i | −0.0431 + 0.2171i | 0.2372 − 0.3286i |
| 0.0505 − 0.0090i | −0.4735 + 0.4716i | 0.0910 + 0.7615i | 0.0895 + 0.3060i |

What is claimed is:

1. A method comprising:
    quantizing a column of a beamforming matrix using a codebook;
    performing a Householder reflection on the beamforming matrix to reduce the dimensionality of the beamforming matrix;
    recursively repeating the quantizing and performing of Householder reflection resulting in a plurality of quantized column vectors; and
    transmitting the plurality of quantized column vectors using a wireless device.

2. The method of claim 1 wherein each of the plurality of quantized column vectors is quantized using a different codebook.

3. The method of claim 2 wherein a size of the codebook for each recursion is smaller than a size of a codebook for a previous recursion.

4. The method of claim 1 wherein the beamforming matrix comprises three columns, and recursively repeating the quantizing comprises quantizing a first column using six bits, a second column using five bits, and a third column using four bits.

5. The method of claim 1 wherein the beamforming matrix comprises three columns, and recursively repeating the quantizing comprises quantizing a first column using five bits, a second column using four bits, and a third column using three bits.

6. The method of claim 1 further comprising:
    quantizing a small matrix using a codebook having entries that represent small matrices.

7. The method of claim 1 wherein quantizing a column of a beamforming matrix comprises normalizing the average power of each element within the column to unity, and quantizing each element using a radial constellation.

8. The method of claim 1 wherein quantizing a column of a beamforming matrix comprises partitioning the column into sub-vectors, and quantizing the sub-vectors.

9. The method of claim 1 wherein performing a Householder reflection on the beamforming matrix comprises performing the Householder reflection as a function of the column vector.

10. The method of claim 1 wherein performing a Householder reflection on the beamforming matrix comprises performing the Householder reflection as a function of a column vector selected from a codebook.

11. A method comprising:
receiving a plurality of quantized column vectors over a wireless medium;
determining at least one Householder matrix from the plurality of quantized column vectors; and
recursively applying the at least one Householder matrix to the plurality of quantized column vectors to generate a beamforming matrix.

12. The method of claim 11 wherein determining at least one Householder matrix comprises:
indexing into a codebook using a quantized column vector to yield a column vector; and
calculating a Householder matrix as a function of the column vector.

13. The method of claim 12 wherein determining at least one Householder matrix comprises indexing into a codebook using a quantized column vector to yield a Householder matrix.

14. The method of claim 11 wherein determining at least one Householder matrix comprises:
indexing into at least one codebook using two quantized column sub-vectors to yield a column vector; and
calculating a Householder matrix as a function of the column vector.

15. An article comprising:
a machine-readable medium adapted to hold instructions that when accessed result in a machine quantizing a column of a beamforming matrix using a codebook, performing a Householder reflection on the beamforming matrix to reduce the dimensionality of the beamforming matrix, recursively repeating the quantizing and performing of Householder reflection resulting in a plurality of quantized column vectors, and transmitting the plurality quantized column vectors using a wireless device.

16. The article of claim 15 wherein each of the plurality of quantized column vectors is quantized using a different codebook.

17. The article of claim 16 wherein a size of the codebook for each recursion is smaller than a size of a codebook for a previous recursion.

18. The article of claim 15 wherein the beamforming matrix comprises three columns, and recursively repeating the quantizing comprises quantizing a first column using six bits, a second column using five bits, and a third column using four bits.

19. The article of claim 15 wherein the beamforming matrix comprises three columns, and recursively repeating the quantizing comprises quantizing a first column using five bits, a second column using four bits, and a third column using three bits.

20. An electronic system comprising:
N antennas;
a processor coupled to the N antennas;
an Ethernet interface; and
an article having a machine-readable medium adapted to hold instructions that when accessed result in the processor determining a Householder matrix from a quantized column vector, and generating a beamforming matrix by multiplying the Householder matrix by a second column vector.

21. The electronic system of claim 20 wherein determining a Householder matrix comprises:
indexing into a codebook using the quantized column vector to yield a column vector; and
calculating the Householder matrix as a function of the column vector.

22. The electronic system of claim 21 wherein determining a Householder matrix comprises indexing into a codebook using the quantized column vector to yield the Householder matrix.

23. The electronic system of claim 20 wherein the instructions, when accessed, further result in the processor recursively reconstructing the beamforming matrix by using Householder transformations.

* * * * *